(12) United States Patent
Allen

(10) Patent No.: US 9,818,078 B1
(45) Date of Patent: Nov. 14, 2017

(54) CONVERTING A NON-WORKFLOW PROGRAM TO A WORKFLOW PROGRAM USING WORKFLOW INFERENCING

(71) Applicant: Amazon Technologies, Inc., Seattle, WA (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 40 days.

(21) Appl. No.: 13/796,240

(22) Filed: Mar. 12, 2013

(51) Int. Cl.
*G06Q 10/00* (2012.01)
*G06Q 10/06* (2012.01)

(52) U.S. Cl.
CPC ... *G06Q 10/0633* (2013.01); *G06Q 10/06316* (2013.01)

(58) Field of Classification Search
CPC .............................................. G06Q 10/06316
USPC ........................................................ 705/7.26
See application file for complete search history.

(56) References Cited

U.S. PATENT DOCUMENTS

| | | | |
|---|---|---|---|
| 2002/0170035 A1* | 11/2002 | Casati et al. | 717/127 |
| 2002/0188644 A1* | 12/2002 | Seidman | 709/100 |
| 2006/0069605 A1* | 3/2006 | Hatoun | 705/9 |
| 2008/0134198 A1* | 6/2008 | Grasselt et al. | 718/106 |
| 2009/0125362 A1* | 5/2009 | Reid et al. | 705/8 |
| 2009/0183063 A1* | 7/2009 | Malkin et al. | 715/222 |
| 2010/0280865 A1* | 11/2010 | Goja | 705/8 |
| 2011/0282708 A1* | 11/2011 | Rangaswamy et al. | 705/7.27 |
| 2012/0116836 A1* | 5/2012 | Flores et al. | 705/7.27 |
| 2014/0009471 A1* | 1/2014 | Lee et al. | 345/440 |
| 2014/0012740 A1* | 1/2014 | Carson et al. | 705/39 |

OTHER PUBLICATIONS

Web Article: "Amazon Simple Workflow Service (beta)" [online] [retrieved on Feb. 26, 2013] retrieved from: http://aws.amazon.com/swf/ 6 pps.

* cited by examiner

*Primary Examiner* — Sujay Koneru
(74) *Attorney, Agent, or Firm* — Lee & Hayes, PLLC; Charles L. Warner

(57) ABSTRACT

Event records, such as log files, generated by a non-workflow program may be collected and provided to an event processor. The event processor may cluster the event records into distinct event clusters. A network inferencer may then generate one or more candidate workflow networks based on the event clusters generated by the event processor. Scores may be generated for evaluating the candidate workflow networks based upon the ability of the candidate workflow networks to explain the event records and/or the ability of the event records to attest to the candidate workflow networks. A workflow inferencer may then map a candidate workflow network to a workflow description.

20 Claims, 13 Drawing Sheets

CONVERTING A NON-WORKFLOW PROGRAM TO A WORKFLOW PROGRAM USING WORKFLOW INFERENCING

BACKGROUND

It can be both time-consuming and costly to build and track software applications using traditional development approaches that include processing steps that run at different times and that have different durations, while ensuring the steps are executed reliably and without duplication. When the execution of an application is distributed across multiple systems, the coordination of processing steps across the multiple systems may present an even greater challenge.

One alternative to traditional software development involves the use of a workflow execution system to implement an application. Utilizing a workflow execution system, developers can structure the various processing steps in a software application as "tasks" that drive work in distributed applications. The workflow execution service can coordinate these tasks in a reliable and scalable manner. For example, a workflow execution system might manage task execution dependencies, scheduling, and concurrency based on the application logic supplied by the developer. The workflow execution system might also store tasks, reliably dispatch the tasks to application components, track the progress of tasks, and keep information describing the latest state of the tasks.

One challenge associated with the use of workflow execution systems stems from the difficulty in converting applications not originally programmed for execution by a workflow execution system ("non-workflow applications") for use with the workflow execution system. Non-workflow applications might be composed of many individual, sequential programs running at different times and for different durations on many different physical or virtual machines. As a result, the process of manually converting a non-workflow program to a workflow program configured for use with a workflow execution system might be difficult, time consuming, and costly.

The disclosure made herein is presented with respect to these and other considerations.

DETAILED DESCRIPTION

Figure 1:
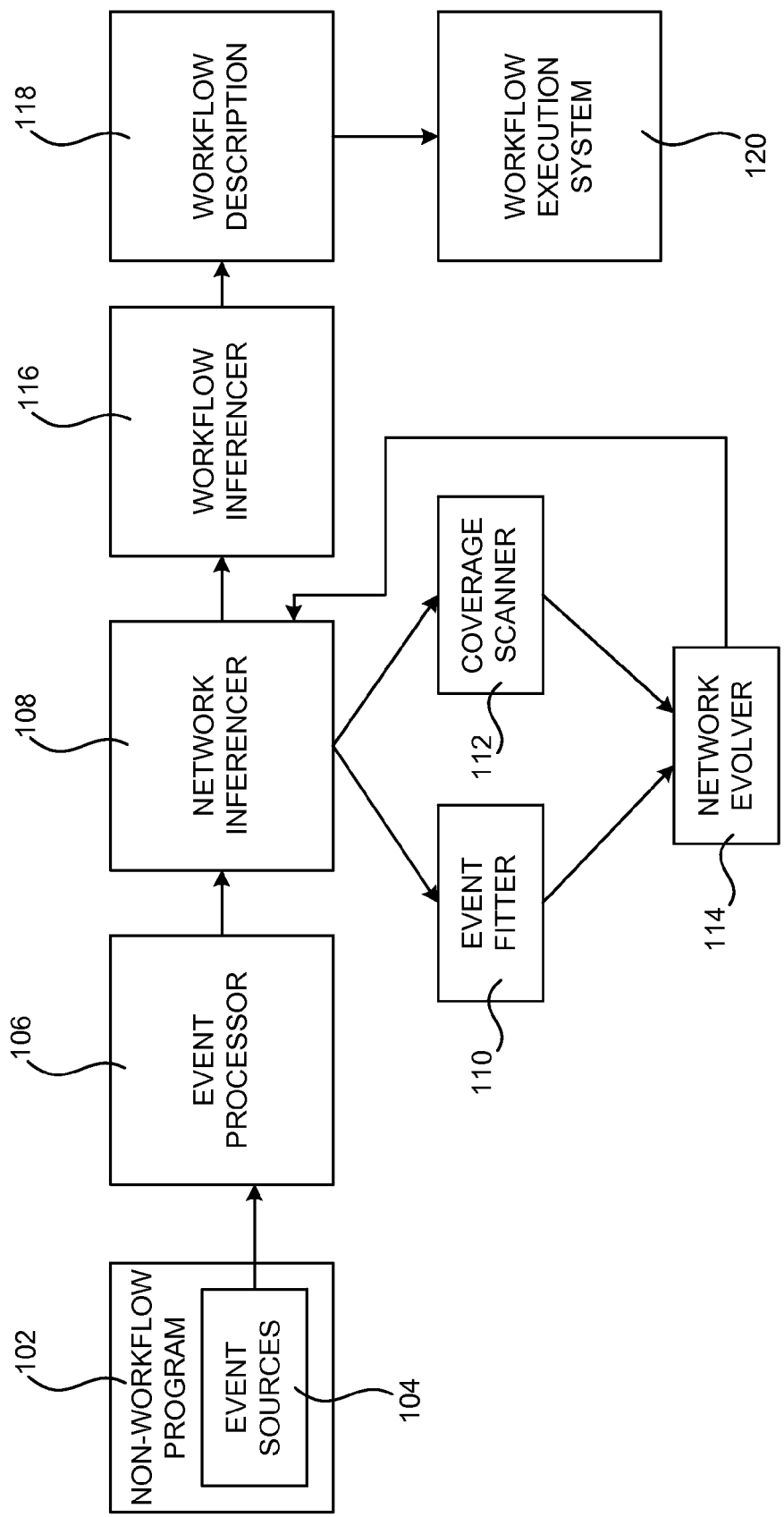
FIG. 1 is a software architecture diagram showing aspects of one illustrative mechanism described herein for converting a non-workflow program to a workflow program utilizing workflow inferencing.

The following detailed description is directed to technologies for converting a non-workflow program to a workflow program utilizing workflow inferencing. Utilizing the technologies described herein, a non-workflow program can be converted to a workflow program ("referred to herein as a "workflow description") suitable for execution on a workflow execution system, by inferring the workflow description from data generated by the non-workflow program. The automated conversion of a non-workflow program to a workflow description in this manner may be less costly and time consuming than performing a manual conversion.

According to one aspect presented herein, a computer-implemented mechanism is disclosed for utilizing workflow inferencing to convert a non-workflow program to a workflow description suitable for use with a workflow execution system. In particular, event records, such as log files, generated by a non-workflow program may be collected and provided to an event processor. The event processor may cluster the event records into distinct event clusters. A network inferencer may then generate a candidate workflow network based on the event clusters generated by the event processor.

Scores may be generated for evaluating the candidate workflow network based upon the ability of the candidate workflow network to explain the event records and/or the ability of the event records to attest to the candidate workflow network. A workflow inferencer may then map the candidate workflow network to a workflow description. In this way, a workflow description may be more easily generating than by using manual methods by deriving the workflow description from data generated during execution of the non-workflow program. Additional details regarding the various components and processes described above for converting a non-workflow program to a workflow description using workflow inferencing will be presented below with regard to FIGS. 1-13.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a software architecture diagram showing an overview of one illustrative mechanism described herein for converting a non-workflow program to a workflow description utilizing workflow inferencing. In the embodiment shown in FIG. 1, workflow inferencing is utilized to create a workflow description 118 for a non-workflow program 102 that is suitable for use with a workflow execution system 120. The phrase workflow inferencing refers to a process of making inferences about the structure and operation of a non-workflow program 102 based upon data collected during the operation of the non-workflow program 102, and generating a workflow description 118 based upon the inferences. The workflow description 118 may then be utilized to implement the same functionality provided by the non-workflow program 102 in the workflow execution system 120. Details regarding this process will be provided below.

As described above, the workflow execution system 120 provides functionality for implementing an application, such as a distributed application. Utilizing the workflow execution system 120, developers can structure the various processing steps in an application as "tasks" that drive work in distributed applications. The workflow execution service 120 can coordinate these tasks in a reliable and scalable manner. For example, the workflow execution system 120 might manage task execution dependencies, scheduling, and concurrency based on the application logic set forth in the workflow description 118. The workflow execution system 120 might also store tasks, reliably dispatch the tasks to application components, track the progress of tasks, and keep information describing the latest state of the tasks. The workflow execution system 120 might also provide other functionality. One example of a workflow execution system 120 is the AMAZON SIMPLE WORKFLOW SERVICE from AMAZON.COM of Seattle, Wash. The embodiments disclosed herein might, however, also be utilized with other workflow execution systems 120 provided by other vendors.

The non-workflow program 102 is a program that has not been configured for use with the workflow execution system 102. For example, the non-workflow program 102 might be a distributed application that utilizes a number of services that call one another in various ways to implement a desired process. During execution of the non-workflow program 102, event sources 104 within the non-workflow program 102 may generate various kinds of text data describing the operation of the non-workflow program 102. This data, referred to herein as "event records", might include, for instance, text log data describing various types of processing or inter-service calls performed by the non-workflow program 102. The event sources 104 might be programs, modules, threads, functions, applications, or other types of software or hardware components utilized to implement the non-workflow program 102.

In one embodiment, an event processor 106 receives the event records from the event sources 104 in the non-workflow program 102. The event processor 106 then utilizes one or more clustering mechanisms to cluster the event records into clusters. Clustering refers to a process of grouping a set of objects in such a way that objects in the same cluster are more similar, in some sense or another, to each other than to those in other clusters. In one embodiment, a k-center clustering algorithm is utilized to cluster the event records that uses a distance metric that is based, at least in part, upon an edit distance of text contained in the event records. As will be described in greater detail below, the edit distance may be modified to exclude one or more text variations that do not impact the structural conformance of the event records. Other types of clustering algorithms might also be utilized to cluster the event records. Additional details regarding the operation of the event processor 106 will be provided below with regard to FIGS. 2 and 3.

Once the event records have been clustered, the event clusters are provided to a network inferencer 108 in one embodiment. The network inferencer 108 is configured to generate one or more candidate workflow networks based upon the event clusters. In order to provide this functionality, the network inferencer 108 may associate each event cluster with a node in a candidate workflow network. The network inferencer 108 may then generate a candidate workflow network by connecting nodes in the candidate workflow network based upon relationships between the event clusters. Additional details regarding the operation of the network inferencer 108 will be provided below with regard to FIGS. 4 and 5.

In some embodiments, one or more scores are generated for the candidate workflow networks. For example, in some embodiments, an event fitter 110 might be utilized to generate an "explanation" score. An explanation score expresses the ability of a candidate workflow network to explain the event records utilized to generate the candidate workflow network. In some embodiments, a coverage scanner 112 might also be utilized to generate an "attestation" score. An attestation score expresses the ability of the event records to attest to a candidate workflow network. The scores might be utilized to select one or more of the candidate workflow networks for further consideration in the manner described below. Other types of scores might also be utilized in other embodiments. Additional details regarding the operation of the event fitter 110 and the coverage scanner 112 will be provided below with regard to FIGS. 6-8.

In some implementations, a network evolver 114 is also utilized. The network evolver takes one or more candidate workflow networks having appropriate attestation and explanation scores and generates mutations of the candidate workflow networks (referred to herein as "new candidate workflow networks"). For example, the network evolver 114 might generate new candidate workflow networks by randomly modifying nodes or connections between nodes in a candidate workflow network generated by the network inferencer 108. Mutations might also be generated in other ways. The event fitter 110 and/or coverage scanner 112 might then be utilized to generate scores for the new candidate workflow networks. Additional details regarding the operation of the network evolver 114 will be provided below with regard to FIGS. 9 and 10.

Once a number of new candidate workflow networks have been generated, one of the new candidate workflow networks is selected for use in generating the workflow description 118. For example, one of the new workflow networks having the highest scores might be selected for use in generating the workflow description 118. Other criteria might also be utilized to select a candidate workflow network for use in generating the workflow description 118.

In one implementation, a workflow inferencer 116 generates the workflow description 118 from the selected candidate workflow network. In order to generate the workflow description 118, the workflow inferencer 116 maps the selected candidate workflow network to the workflow description 118 based upon event types correlated to nodes in the selected candidate workflow network. The workflow description 118 includes a description of the workflow network utilized by the non-workflow program 102 and, in one embodiment, includes program code templates into which the actual program code from the non-workflow program 102 for performing workflow activities may be copied. The workflow description 118 may then be utilized to implement the same functionality provided by the non-workflow program 102 in the workflow execution system 120. Additional details regarding the operation of the workflow inferencer 116 will be provided below with regard to FIGS. 11 and 12.

It should be appreciated that the arrangement of components shown in FIG. 1 is merely illustrative and that different numbers and arrangements of components might be utilized in other embodiments to provide the functionality disclosed herein. It should also be appreciated that the various components illustrated in FIG. 1, and described in greater detail herein, might be implemented as software components configured for execution on the same or different computing systems, might be implemented as hardware components, or might be implemented as a combination of software and hardware. Other implementations might also be utilized in other embodiments.

Figure 2:
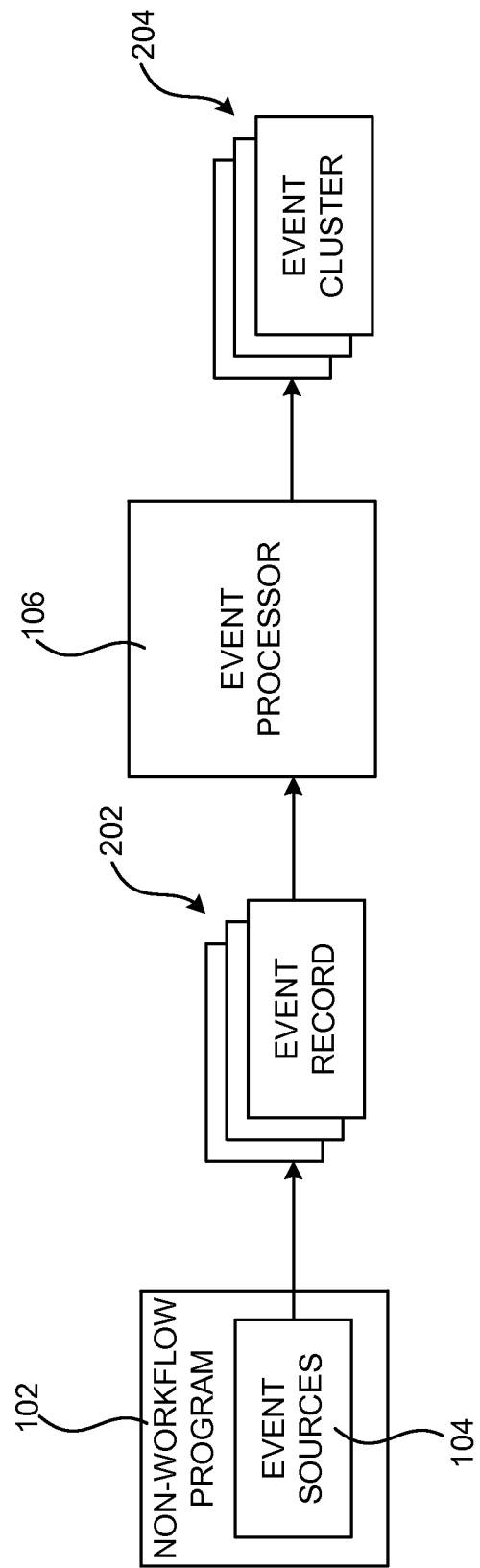
FIG. 2 is a software architecture diagram showing aspects of the operation of an event processor, according to one embodiment disclosed herein.

FIG. 2 is a software architecture diagram illustrating additional aspects of the operation of the event processor 106, according to one embodiment disclosed herein. As described briefly above, the event processor 106 may collect event records 202 from event sources 104 within the non-workflow program 102. As also discussed above, the event records 202 describe aspects of the operation of the non-workflow program 102. For example, event records 202 include, but are not limited to, activity logs, event logs, error logs, service call records, trace logs, event traces, access logs, debugging logs, diagnostic logs, and instrumentation logs. Additionally, the non-workflow program 102 might be modified to generate event records 202 for use in facilitating the workflow inferencing program described herein. Other types of data generated by the event sources 104 within the non-workflow program 102 might also be utilized.

For example, the implementation of the non-workflow program 102 may include one or more Web services that have access logs, error logs, service call records, event traces, or other sources of event records 202. The event processor 106 may ingest the event records 202 by parsing lines in the event records 202 and constructing database rows for each event, along with metadata describing the event source, event time, session identifiers, or other contextual information about the event. Other types of information might also be retrieved from the event records 202 and utilized in the manner described herein.

Once a sufficient number of event records 202 have been received, the event processor 106 may then cluster the collected event records 202 into a plurality of distinct event clusters 204. In some embodiments the event processor 106 may cluster the event records 202 by performing k-center clustering using a distance metric based at least in part on edit distance of the text in the event records 202. In some embodiments, the edit distance may be modified to exclude known text variations not impacting structural conformance by, for example, treating timestamps in the event records 202 as being equal despite having different times, treating session identifiers in the event records 202 as being equal despite specifying different sessions, or the like.

As the number of workflow states defined by the non-workflow program 102 might not be known, the event processor 106 may attempt many cluster operations with varying numbers of centers based on the number and magnitude of outliers or based on the diameters of the resulting clusters. The event processor 106 might also locate centers using various algorithms including, but not limited to, a farthest-point first heuristic, a gravity heuristic, or random selection.

Figure 3:
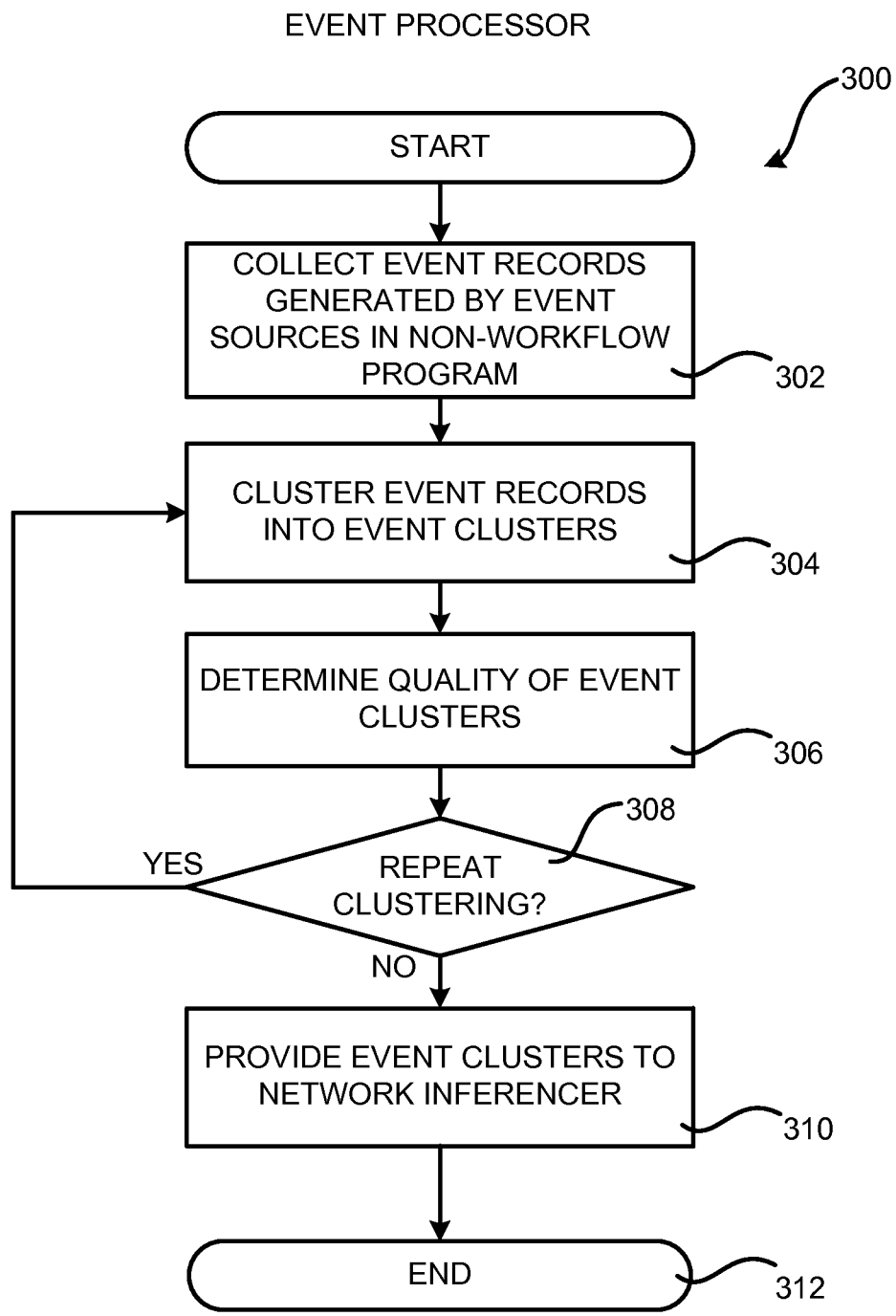
FIG. 3 is a flow diagram showing a routine that illustrates aspects of the operation of an event processor, according to one illustrative embodiment disclosed herein.

FIG. 3 is a flow diagram showing a routine 300 that illustrates aspects of the operation of the event processor 106, according to one illustrative embodiment disclosed herein. It should be appreciated that the logical operations described herein with respect to FIG. 3, and the other FIGS., are implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 300 begins at operation 302, where the event processor 106 collects event records 202 generated by event sources 104 in the non-workflow program 102. The routine 300 then proceeds from operation 302 to operation 304, where the event processor 106 clusters the event records 202 into event clusters 204. As mentioned above, various mechanisms might be utilized to perform the clustering, such as a k-center clustering algorithm. Other algorithms might also be used in other embodiments. Additionally, the clustering might be performed multiple times.

From operation 304, the routine 300 proceeds to operation 306, where the event processor 106 might determine the quality of the event clusters 204. Various mechanisms might be utilized to determine the quality of the event clusters 204. From operation 306, the routine 300 proceeds to operation 308, where a determination is made based upon the determined quality of the event clusters 204 whether additional clustering operations are to be performed. If additional clustering is to be performed, the routine 300 proceeds back to operation 304, described above.

If no additional clustering is to be performed, the routine 300 proceeds from operation 308 to operation 310. At operation 310, the event processor 106 provides the event clusters 204 to the network inferencer 108. The routine 300 then proceeds from operation 310 to operation 312, where it ends.

Figure 4:
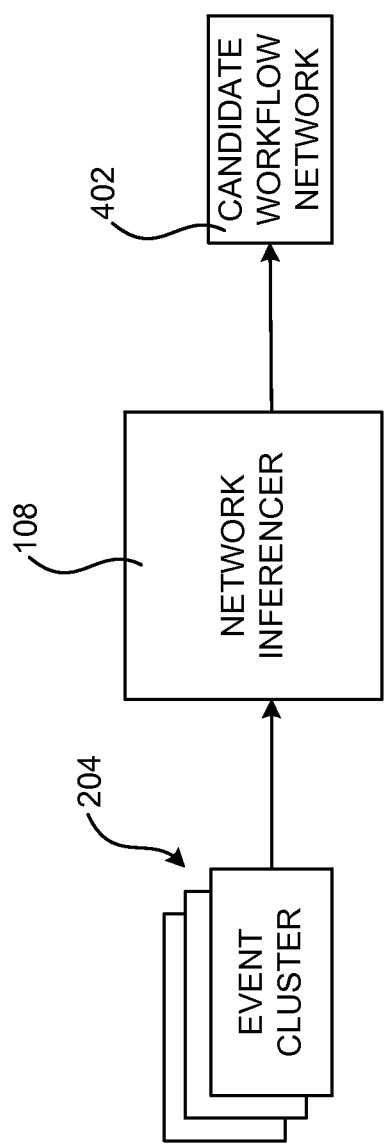
FIG. 4 is a software architecture diagram showing aspects of the operation of a network inferencer, according to one illustrative embodiment disclosed herein.

FIG. 4 is a software architecture diagram showing aspects of the operation of the network inferencer 108, according to one illustrative embodiment disclosed herein. As shown in FIG. 4, and described briefly above, the network inferencer 108 may generate a candidate workflow network 402 based on the distinct event clusters 204. In order to provide this functionality, the network inferencer 108 may associate each event cluster 204 with a node in the candidate workflow network 402 and create connections between nodes based on inter-cluster relationships to create a directed, potentially cyclic, graph.

For example, the network inferencer 108 might determine a "from-to" relationship between nodes in the network based on events in one event cluster 204 being correlated with events in another event cluster 204 using a session identifier and the correlated events in the first cluster having earlier timestamps than the correlated events in the second cluster. As another example, the network inferencer 108 may determine a mutually exclusive branching relationship between nodes in the network by detecting disjoint sets of events correlated using a session identifier. As yet another example, the network inferencer 108 may determine a loop relationship as opposed to a sequential relationship based on a heuristic for the maximum number of event iterations found. Other mechanisms might also be utilized to create relationships between nodes in a candidate workflow network 402.

Figure 5:
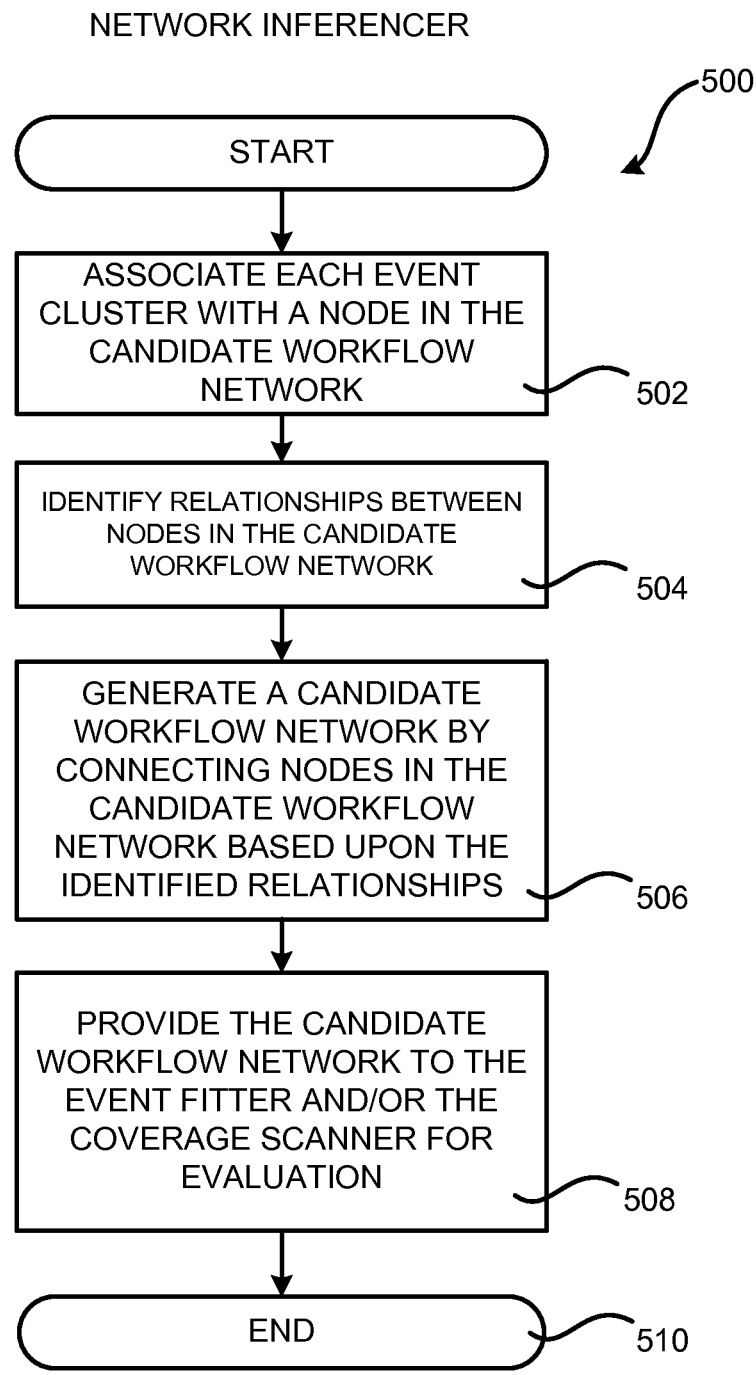
FIG. 5 is a flow diagram showing a routine that illustrates aspects of the operation of a network inferencer, according to one illustrative embodiment disclosed herein.

FIG. 5 is a flow diagram showing a routine 500 that illustrates aspects of the operation of a network inferencer 108, according to one illustrative embodiment disclosed herein. The routine 500 begins at operation 502, where the network inferencer 108 associates event clusters with nodes in the candidate workflow network 402. The routine 500 then proceeds from operation 502 to operation 504, where the network inferencer 108 identifies relationships between nodes in the candidate workflow network 402. As discussed above, the relationships might be identified based upon sequential flows, parallel flows, branching operations, and/ or other types of conditional operations.

From operation 504, the routine 500 proceeds to operation 506, where the network inferencer 108 connects nodes in the candidate workflow network 402 based upon the relationships between the nodes identified at operation 504. As mentioned above, the connections between the nodes in the candidate workflow network 402 are based upon inter-cluster relationships and create a directed, potentially cyclic, graph. The routine 500 then proceeds from operation 506 to operation 508, where the network inferencer 108 might provide the candidate workflow network 402 to the event fitter 110 and/or the coverage scanner 112 for scoring. The routine 500 then proceeds from operation 508 to operation 510, where it ends.

Figure 6:
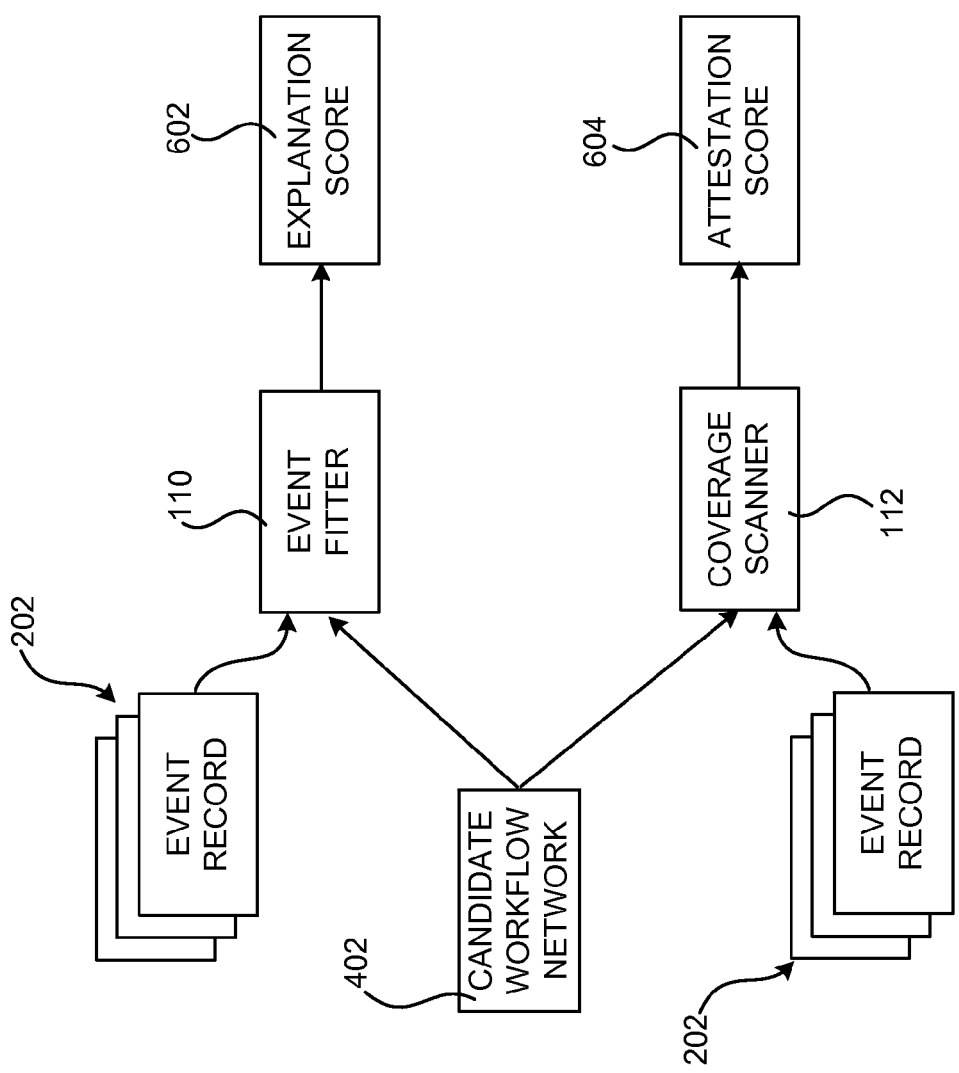
FIG. 6 is a software architecture diagram showing aspects of the operation of an event fitter and a coverage scanner, according to one illustrative embodiment disclosed herein.

FIG. 6 is a software architecture diagram showing aspects of the operation of the event fitter 110 and the coverage scanner 112, according to one illustrative embodiment disclosed herein. As described briefly above, the event fitter 110 may generate an explanation score 602 for the candidate workflow network 402 based on an ability of the candidate workflow network 402 to explain the event records 202. For example, the event fitter 110 may select all or a portion of the event records 202 to test against the candidate workflow network 402 using a correlating factor, such as a session identifier. The event fitter 110 may then construct a sequential flow based on timestamps for the selected events. The event fitter 110 may map the sequential flow to a path through the candidate workflow network 402 and calculate an edit distance between the flow and the path to generate the explanation score 602 that expresses the predictive ability of the candidate workflow network 402.

In some embodiments the event fitter 110 may penalize (i.e. negatively impact the explanation score 602) the candidate workflow network 402 for each event in the sequential flow not predicted by the path, and for each node in the path lacking an observed event in the sequential flow. Other considerations might also be utilized to penalize or augment the explanation score 602 computed for a particular candidate workflow network 402. Additional details regarding the operations performed by the event fitter 110 will be provided below with regard to FIG. 7.

In some embodiments, a coverage scanner 112 might also generate an attestation score 604 that expresses the ability of the event records 202 to attest to the network structure expressed in the candidate workflow network 402. In order to provide this functionality, the coverage scanner 112 may enumerate or analyze possible paths through the candidate workflow network 402. For each enumerated path, the coverage scanner 112 may then attempt to find a portion of the event records 202 for which a sequential flow of the event records corresponds to the path.

In some embodiments, the coverage scanner 112 may penalize the candidate workflow network 402 based on the number of paths not covered by any combination of event records 202, and based on the number of paths ambiguously covered by the same combination of event records 202. Other considerations might also be utilized to penalize or augment the attestation score 604 computed for a particular candidate workflow network 402. Additional details regarding the operations performed by the coverage scanner 112 will be provided below with regard to FIG. 8.

Figure 7:
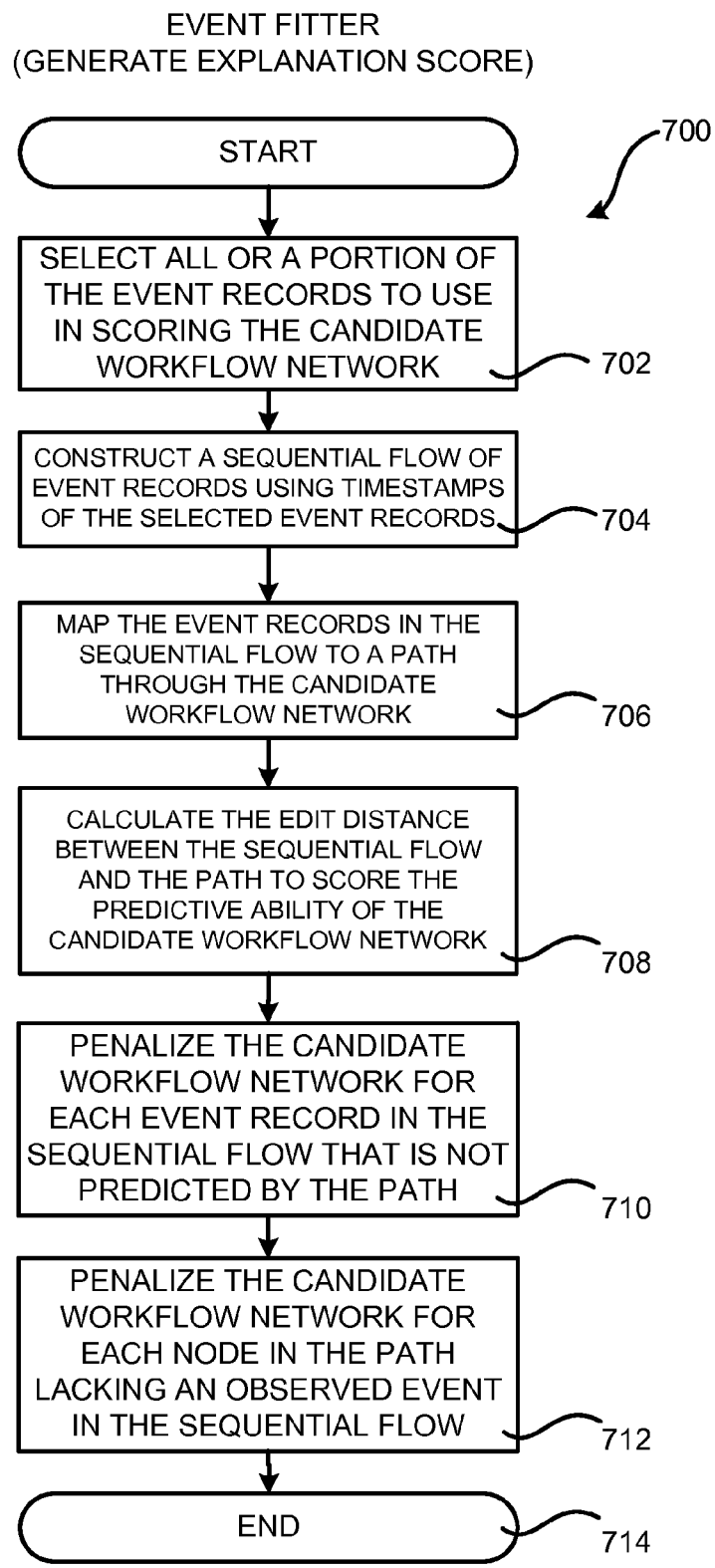
FIG. 7 is a flow diagram showing a routine that illustrates aspects of the operation of an event fitter, according to one illustrative embodiment disclosed herein.

FIG. 7 is a flow diagram showing a routine 700 that illustrates aspects of the operation of the event fitter 110, according to one illustrative embodiment disclosed herein. The routine 700 begins at operation 702, where the event fitter 110 selects all or a portion of the event records 202 to use in generating the explanation score 602 for a particular candidate workflow network 402. The routine 700 then proceeds from operation 702 to operation 704.

At operation 704, the event fitter 110 constructs a sequential flow of event records 202 using timestamps of the selected event records 202. The routine 700 then proceeds to operation 706, where the event fitter maps the event records 202 in the sequential flow to a path through the candidate workflow network 402. The routine 700 then proceeds from operation 706 to operation 708.

At operation 708, the event fitter 110 calculates the edit distance between the sequential flow of event records 202 and the path through the candidate workflow network 402 to generate the explanation score 110 that expresses the predictive ability of the candidate workflow network 402. As mentioned above, the explanation score 602 might be penalized based upon various factors. For example, at operation 710 the explanation score 602 for the candidate workflow network 402 might be penalized for each event record 202 in the sequential flow that is not predicted by the path through the candidate workflow network 402. As another example, at operation 712 the explanation score 602 for the candidate workflow network 402 might be penalized for each node in the path through the candidate workflow network 402 that lacks an observed event in the sequential flow of event records 202. The explanation score 602 might also be penalized based upon other considerations. From operation 712, the routine 700 proceeds to operation 714, where it ends.

Figure 8:
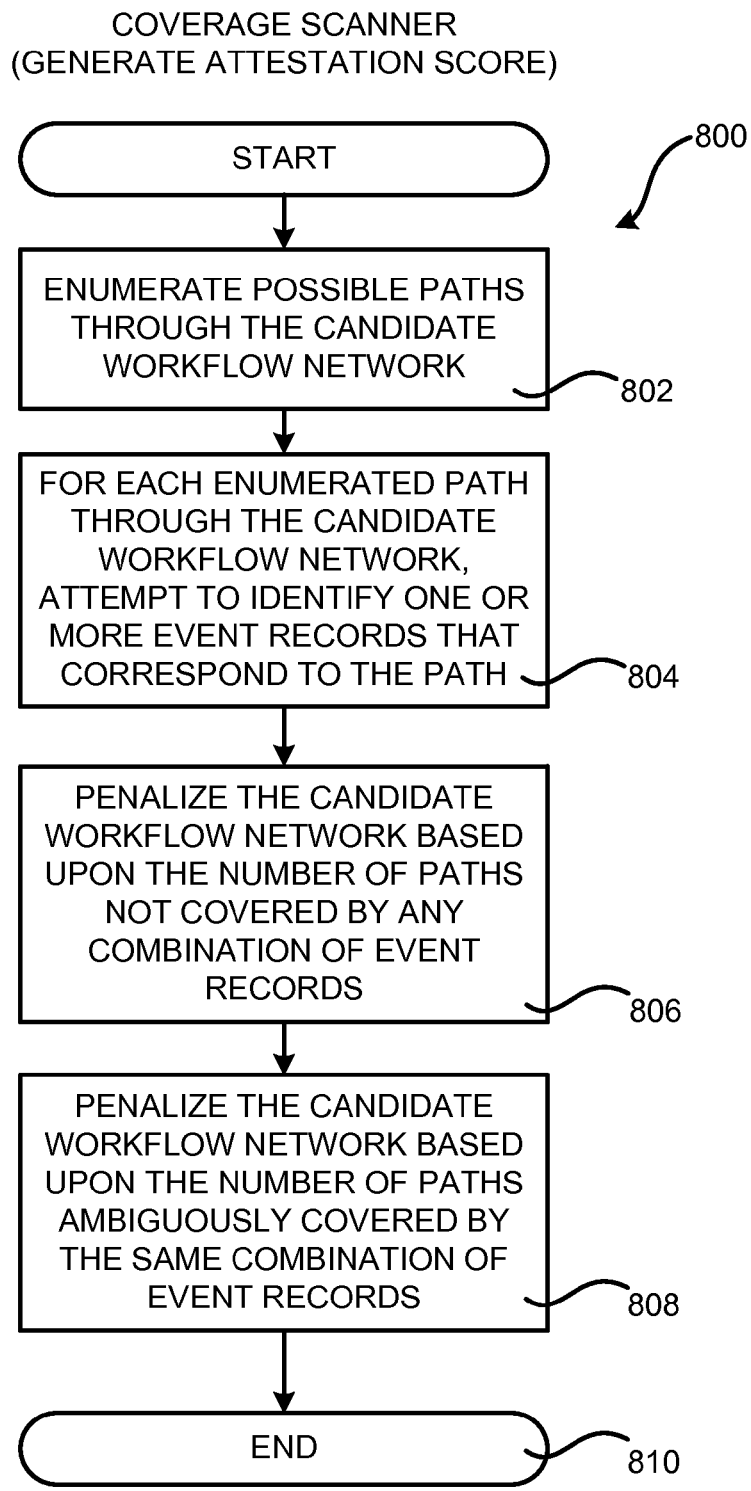
FIG. 8 is a flow diagram showing a routine that illustrates aspects of the operation of a coverage scanner, according to one illustrative embodiment disclosed herein.

FIG. 8 is a flow diagram showing a routine 800 that illustrates aspects of the operation of the coverage scanner 112, according to one illustrative embodiment disclosed herein. The routine 800 begins at operation 802, where the coverage scanner 112 enumerates possible paths through the candidate workflow network 402. The routine 800 then proceeds to operation 804 where, for each enumerated path through the candidate workflow network 402, the coverage scanner 112 attempts to identify one or more event records 202 that correspond to the path. The attestation score 604 is a function of the number of event records 202 that correspond to each path through the candidate workflow network 402.

As mentioned above, the attestation score 604 might be penalized based upon various factors. For example, at operation 806 the attestation score 604 for the candidate workflow network 402 might be penalized based upon the number of paths through the candidate workflow network 402 that are not covered by any combination of event records 202. As another example, at operation 808 the attestation score 604 for the candidate workflow network 402 might be penalized based upon the number of paths ambiguously covered by the same combination of event records 202. The attestation score 604 might also be penalized based upon other considerations. From operation 808, the routine 800 proceeds to operation 810, where it ends.

Figure 9:
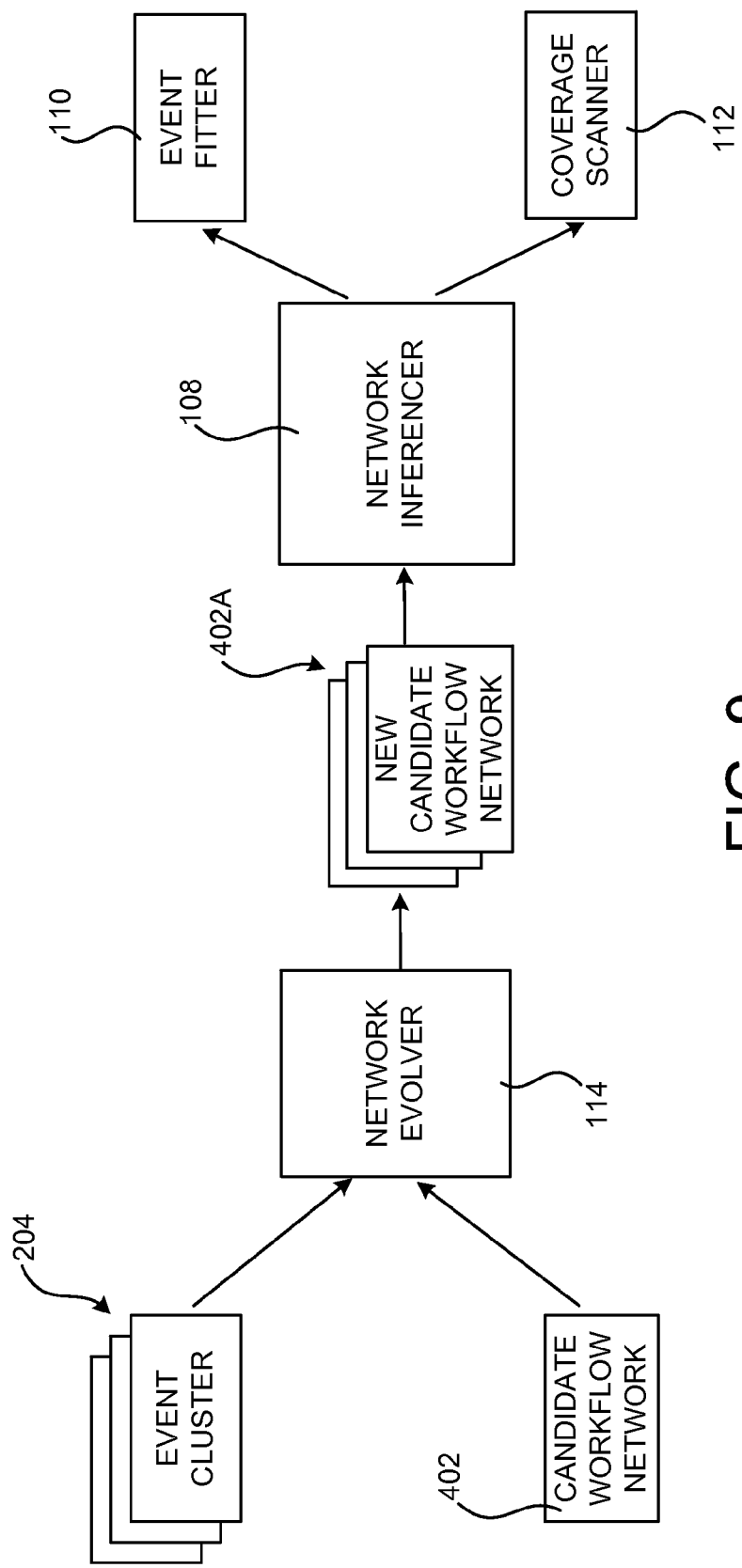
FIG. 9 is a software architecture diagram showing aspects of the operation of a network evolver, according to one illustrative embodiment disclosed herein.

FIG. 9 is a software architecture diagram showing aspects of the operation of the network evolver 114, according to one illustrative embodiment disclosed herein. As described briefly above, the network evolver 114 may take a candidate workflow network 402 having appropriate attestation and explanation scores and generate one or more new candidate workflow networks 402A from the candidate workflow network 402. For example, the network evolver 114 might apply random mutations to the candidate workflow network 402 to generate one or more new candidate workflow networks 402A.

The random mutations applied by the network evolver 114 might include changing one or more of the centers of the event clusters 204. For example, the centers of one or more of the event clusters 204 might be added, deleted, or modified. In another example, the network evolver 114 might also be configured to modify the connections between nodes in the candidate workflow network 402. Other types of random mutations might also be applied to the candidate workflow network 402 to generate the new candidate workflow networks 402A. Once the new candidate workflow networks 402A have been generated, the new candidate workflow networks 402A might be provided to the network inferencer 108, the event fitter 110, and/or the coverage scanner 112 for processing and/or scoring in the manner described above.

In some embodiments, the network evolver 114 may be configured to select a portion of the new candidate workflow networks 402A to continue evaluating based at least in part on the scores described above. For example, the network evolver 114 may generate one or more new candidate workflow networks 402A from a candidate workflow network 402, and select a portion of the new candidate workflow networks 402A to survive further evolution based on which of the new candidate workflow networks 402A had the highest scores and by a distance or dissimilarity metric guiding the surviving new candidate workflow networks 402A to be reasonably distinct.

Figure 10:
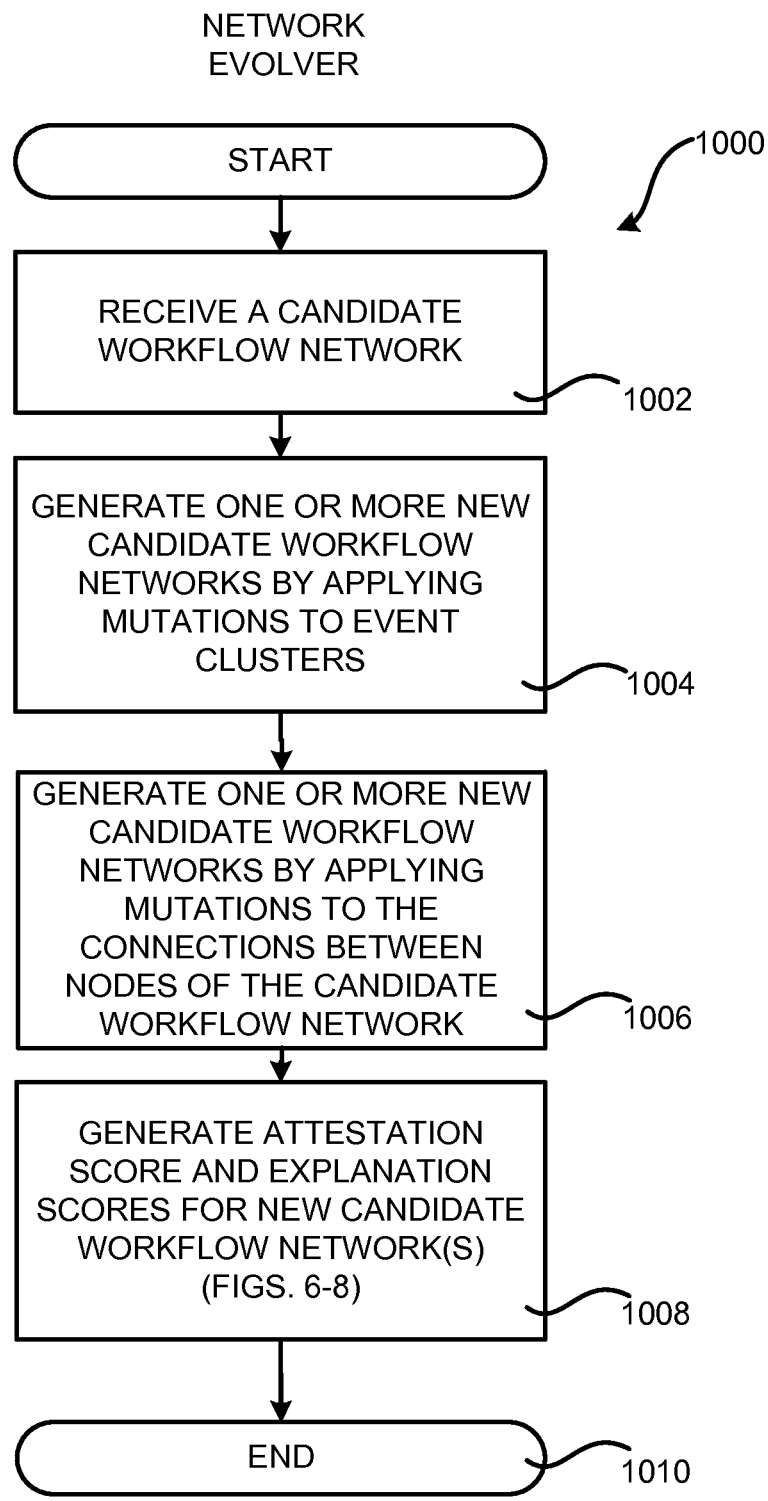
FIG. 10 is a flow diagram showing a routine that illustrates aspects of the operation of a network evolver, according to one illustrative embodiment disclosed herein.

FIG. 10 is a flow diagram showing a routine 1000 that illustrates aspects of the operation of a network evolver 114, according to one illustrative embodiment disclosed herein. The routine 1000 begins at operation 1002, where the network evolver 114 receives a candidate workflow network 402. The routine 1000 then proceeds to operation 1004, where the network evolver 114 generates one or more new candidate workflow networks 402A by applying mutations to the event clusters 204 utilized to generate the candidate workflow network 402. For example, and as described above, the centers of one or more of the event clusters 204 might be added, deleted, or modified.

From operation 1004, the routine 1000 proceeds to operation 1006, where the network evolver 114 generates one or more new candidate workflow networks 402A by applying mutations to the connections between the nodes in the candidate workflow network 402. For example, connections might be added, deleted, or modified. The routine 1000 then proceeds to operation 1008, where the event fitter 110 and/or the coverage scanner 112 might generate explanation and attestation scores for the new candidate workflow networks 402A in the manner described above. From operation 1008, the routine 1000 proceeds to operation 1010, where it ends.

Figure 11:
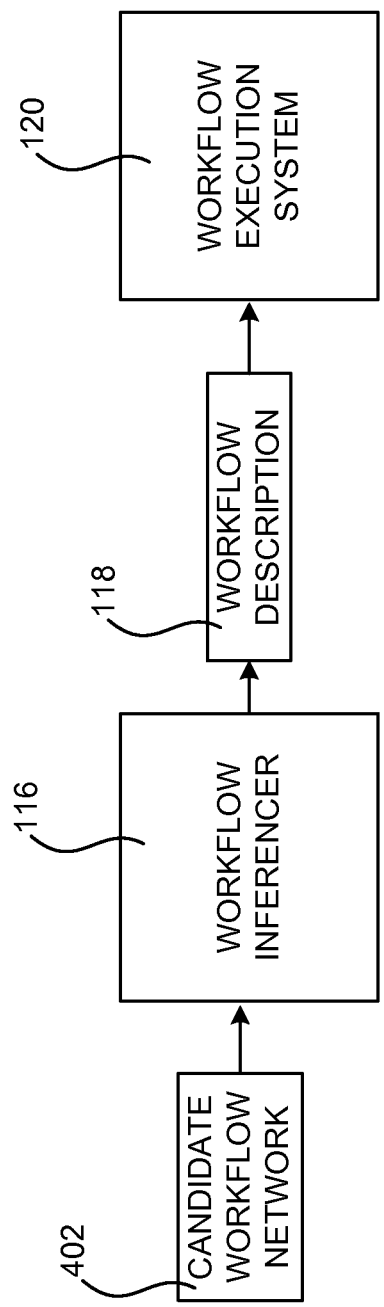
FIG. 11 is a software architecture diagram showing aspects of the operation of a workflow inferencer, according to one illustrative embodiment disclosed herein.

FIG. 11 is a software architecture diagram showing aspects of the operation of the workflow inferencer 116, according to one illustrative embodiment disclosed herein. As mentioned above, the workflow inferencer 116 may generate a workflow description based on a candidate workflow network 402. For example, a candidate workflow network 402 might be selected that has the best attestation and explanation scores. The selected candidate workflow network 402 is utilized to generate the workflow description 118 for the non-workflow program 102.

In order to generate the workflow description 118, the workflow inferencer 116 may translate, or map, the candidate workflow network 402 to a workflow description 118 based on the event types correlated to each node or connection between nodes in the candidate workflow network 402. For example, the workflow inferencer 116 may map a node in the candidate workflow network 402 to a workflow activity based upon the types of events associated with the node. In a similar fashion, the workflow inferencer 116 might also map a connection between nodes in the candidate workflow network 402 to a specific trigger condition based on the parameter values of events associated with the nodes attached to the connection. The workflow inferencer 116 might also map the candidate workflow network 402 to a workflow description 118 in other ways.

As mentioned above, the workflow description 118 includes a description of the workflow network utilized by the non-workflow program 102. For example, the workflow network might be expressed using XML or another suitable language. In one embodiment the workflow description 118 also includes program code templates into which the actual program code from the non-workflow program 102 for performing workflow activities may be copied. Once this has been performed, the workflow description 118 may then be utilized to implement the same functionality provided by the non-workflow program 102 in the workflow execution system 120.

Figure 12:
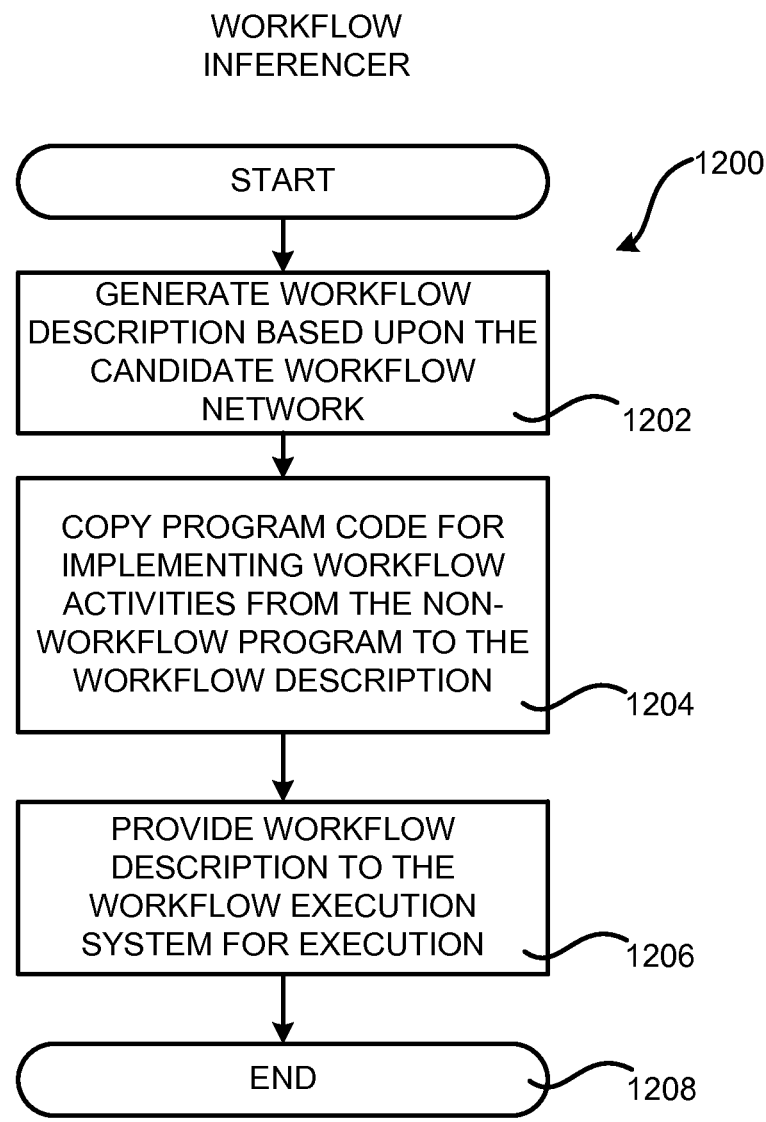
FIG. 12 is a flow diagram showing a routine that illustrates aspects of the operation of a network inferencer, according to one illustrative embodiment disclosed herein.

FIG. 12 is a flow diagram showing a routine 1200 that illustrates aspects of the operation of the workflow inferencer 116, according to one illustrative embodiment disclosed herein. The routine 1200 begins at operation 1202, where the workflow inferencer 116 generates the workflow description 118 based upon the candidate workflow network 402. As discussed above, this might involve may translating, or mapping, the candidate workflow network 402 to a workflow description 118 based on the event types correlated to each node or connection between nodes in the candidate workflow network 402. The routine 1200 then proceeds from operation 1202 to operation 1204.

At operation 1204, program code for implementing the various workflow activities may be copied from the non-workflow program 102 to the workflow description 118. For example, the workflow description 118 might include JAVA or C# bindings, or stubs, for the code for the workflow activities. Program code from the non-workflow program 102 for implementing the workflow activities might be copied into the stubs. This might be performed manually or in an automated fashion according to various embodiments. Once the program code for performing the workflow activities has been copied into the workflow description 118, the routine 1200 proceeds to operation 1206, where the workflow description 118 is provided to the workflow execution system 120 for execution. From operation 1206, the routine 1200 proceeds to operation 1208, where it ends.

Figure 13:
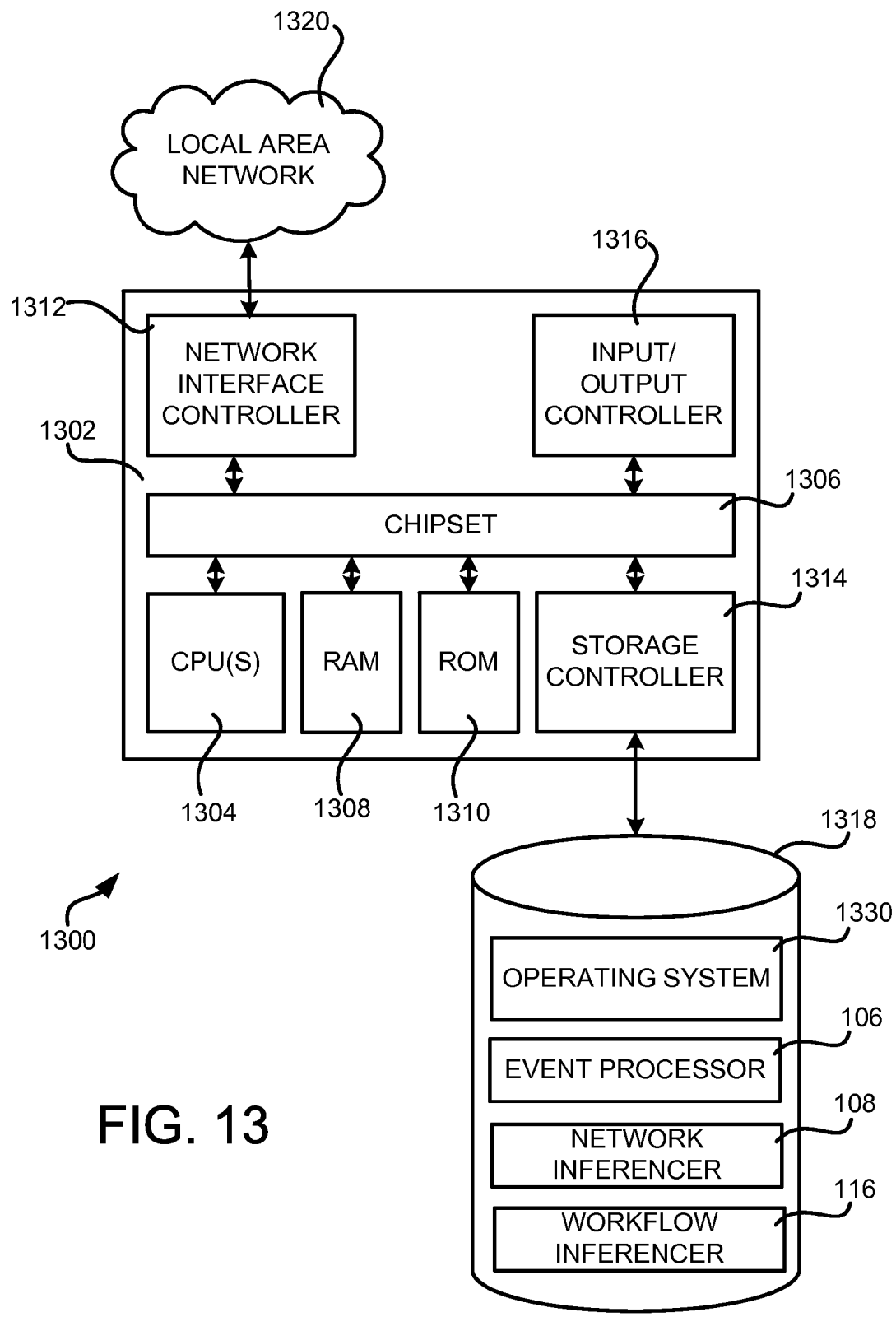
FIG. 13 is a computer architecture diagram showing an illustrative computer hardware architecture for implementing a computing device that might be utilized to implement aspects of the various embodiments presented herein.

FIG. 13 shows an example computer architecture for a computer 1300 capable of executing the program components described above for converting a non-workflow program 102 to a workflow description 118 utilizing workflow inferencing. The computer architecture shown in FIG. 13 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein. For example, the computer architecture shown in FIG. 13 may be utilized to execute the components shown in FIG. 1 and described above when these components are implemented in software.

The computer 1300 includes a baseboard 1302, or "motherboard," which is a printed circuit board to which a multitude of components or devices may be connected by way of a system bus or other electrical communication paths. In one illustrative embodiment, one or more central processing units ("CPUs") 1304 operate in conjunction with a chipset 1306. The CPUs 1304 may be standard programmable processors that perform arithmetic and logical operations necessary for the operation of the computer 1300.

The CPUs 1304 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1306 provides an interface between the CPUs 1304 and the remainder of the components and devices on the baseboard 1302. The chipset 1306 may provide an interface to a random access memory ("RAM") 1308, used as the main memory in the computer 1300. The chipset 1306 may further provide an interface to a computer-readable storage medium such as a read-only memory ("ROM") 1310 or non-volatile RAM ("NVRAM") for storing basic routines that help to startup the computer 1300 and to transfer information between the various components and devices. The ROM 1310 or NVRAM may also store other software components necessary for the operation of the computer 1300 in accordance with the embodiments described herein.

The computer 1300 may operate in a networked environment using logical connections to remote computing devices and computer systems through a network, such as the local area network 1320. The chipset 1306 may include functionality for providing network connectivity through a NIC 1312, such as a gigabit Ethernet adapter. The NIC 1312 is capable of connecting the computer 1300 to other computing devices over the network 1320. It should be appreciated that multiple NICs 1312 may be present in the computer 1300, connecting the computer to other types of networks and remote computer systems.

The computer 1300 may be connected to a mass storage device 1318 that provides non-volatile storage for the computer. The mass storage device 1318 may store system programs, application programs, other program modules, and data, which have been described in greater detail herein. The mass storage device 1318 may be connected to the computer 1300 through a storage controller 1314 connected to the chipset 1306. The mass storage device 1318 may consist of one or more physical storage units. The storage controller 1314 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1300 may store data on the mass storage device 1318 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1318 is characterized as primary or secondary storage, and the like.

For example, the computer 1300 may store information to the mass storage device 1318 by issuing instructions through the storage controller 1314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1300 may further read information from the mass storage device 1318 by detecting the physical states or characteristics of one or more particular locations within the physical storage units.

In addition to the mass storage device 1318 described above, the computer 1300 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1300.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1318 may store an operating system 1330 utilized to control the operation of the computer 1300. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1318 may store other system or application programs and data utilized by the computer 1300, such as the event processor 106, the network inferencer 108, the workflow inferencer 116, and/or any of the other software components and data described above. The mass storage device 1318 might also store other programs and data not specifically identified herein.

In one embodiment, the mass storage device 1318 or other computer-readable storage media is encoded with computer-executable instructions which, when loaded into the computer 1300, transforms the computer from a general-purpose computing system into a special-purpose computer capable of implementing the embodiments described herein. These computer-executable instructions transform the computer 1300 by specifying how the CPUs 1304 transition between states, as described above. According to one embodiment, the computer 1300 has access to computer-readable storage media storing computer-executable instructions which, when executed by the computer 1300, perform the various routines described above with regard to FIGS. 3, 5, 7, 8, 10, and 12. The computer 1300 might also include computer-readable storage media for performing any of the other computer-implemented operations described herein.

The computer 1300 may also include one or more input/output controllers 1316 for receiving and processing input from a number of input devices, such as a keyboard, a mouse, a touchpad, a touch screen, an electronic stylus, or other type of input device. Similarly, the input/output controller 1316 may provide output to a display, such as a computer monitor, a flat-panel display, a digital projector, a printer, a plotter, or other type of output device. It will be appreciated that the computer 1300 may not include all of the components shown in FIG. 13, may include other components that are not explicitly shown in FIG. 13, or may utilize an architecture completely different than that shown in FIG. 13.

Based on the foregoing, it should be appreciated that technologies for converting a non-workflow program to a workflow description using workflow inferencing have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
   access a plurality of event records generated by a plurality of event sources in a non-workflow program during execution of the non-workflow program on a computing device, the event records comprising log data describing different types of processing performed during execution of the non-workflow program, the event sources comprising one or more of a program, a module, a thread, a function, an application, a software component, or a hardware component utilized to implement the non-workflow program, the log data comprising one or more of an access log, an error log, a service call record, or an event trace;
   store the plurality of event records within a memory;
   cluster the stored plurality of event records into a plurality of event clusters;
   generate one or more candidate workflow networks from the plurality of event clusters;
   determine a difference between a sequence of at least a portion of the plurality of event records and at least one of the one or more candidate workflow networks;
   generate one or more scores, based at least in part on the difference, for the one or more candidate workflow networks;
   mutate one or more of the candidate workflow networks selected based at least in part upon the scores to generate one or more new candidate workflow networks;
   generate one or more scores for the one or more new candidate workflow networks;
   select one of the one or more new candidate workflow networks based at least in part upon the one or more scores generated for the one or more new candidate workflow networks;
   programmatically generate the workflow description corresponding to the non-workflow program based at least in part upon the selected new candidate workflow network, wherein the workflow description comprises one or more program code templates;
   store program code corresponding to the non-workflow program into the one or more program code templates, the program code configured to implement one or more functions associated with the non-workflow program; and
   execute, by the computer, the workflow description by executing the program code stored in the one or more program code templates instead of executing the non-workflow program.

2. The non-transitory computer-readable storage medium of claim 1, wherein generate one or more candidate workflow networks from the plurality of event clusters comprises:
   associating each event cluster with a node in the candidate workflow network; and connecting nodes in the candidate workflow network based at least in part upon relationships between the event clusters to generate a candidate workflow network.

3. The non-transitory computer-readable storage medium of claim 1, wherein generate the one or more scores for the one or more candidate workflow networks comprises:
   select one or more event records of the plurality of event records;
   compare a sequence of the one or more event records to a corresponding path of the one or more candidate workflow networks; and
   generate an explanation score based on a difference between the sequence and the corresponding path.

4. The non-transitory computer-readable storage medium of claim 1, wherein generate the one or more scores for the one or more candidate workflow networks comprises:
   determine one or more paths of the one or more candidate workflow networks;
   for each of the one or more paths, attempt to identify one or more event records of the plurality of event records that correspond to the path; and
   generate an attestation score based on a number of the one or more event records identified.

5. The non-transitory computer-readable storage medium of claim 1, wherein generate a workflow description corresponding to the non-workflow program based at least in part upon the selected new candidate workflow network comprises mapping the selected new candidate workflow network to a workflow description based at least in part upon event types correlated to nodes in the new candidate workflow network.

6. The non-transitory computer-readable storage medium of claim 1, wherein the event records are clustered into the plurality of event clusters by performing k-center clustering using a distance metric that is based at least in part upon an edit distance of text contained in the event records.

7. The non-transitory computer-readable storage medium of claim 6, wherein the edit distance is modified to exclude one or more text variations that do not impact a structural conformance of the event records.

8. A system for converting a non-workflow program to a workflow description suitable for use with a workflow execution system, the system comprising:
   one or more computing systems comprising at least one storage unit and at least one processing unit configured to execute:
      an event processor configured to store in the at least one storage unit a plurality of event records generated by the non-workflow program during execution of the non-workflow program, and to cluster, by the at least one processing unit, the stored plurality of event records into a plurality of event clusters prior to execution of the workflow description corresponding to the non-workflow program on the workflow execution system, the event records being generated by a plurality of event sources, the event records comprising one or more of an access log, an error log, a service call record, or an event trace, the event sources comprising one or more of a program, a module, a thread, a function, an application, a software component, or a hardware component utilized to implement the non-workflow program,
      a network inferencer configured to generate, by the at least one processing unit, a candidate workflow network from the plurality of event clusters,
      an event fitter configured to select, by the at least one processing unit, one or more event records of the plurality of event records, compare a sequence of the one or more event records to a corresponding path of the candidate workflow network, and generate an explanation score based at least in part on a difference between the sequence and the corresponding path,
      a workflow inferencer configured to generate, by the at least one processing unit, the workflow description from the candidate workflow network, wherein the workflow description comprises one or more program code templates storing program code configured to implement one or more functions associated with the non-workflow program, and
      the workflow execution system configured to execute the workflow description by executing the stored program code instead of executing the non-workflow program.

9. The system of claim 8, further comprising a coverage scanner and a network evolver,
   the coverage scanner configured to:
      determine one or more paths of the candidate workflow network;
      attempt to identify one or more event records of the plurality of event records that correspond to the one or more paths; and
      generate an attestation score based at least in part on a number of the one or more event records identified, and
   the network evolver configured to mutate the candidate workflow network to generate one or more new candidate workflow networks.

10. The system of claim 8, further comprising a coverage scanner configured to:
   determine one or more paths of the candidate workflow network;
   for each of the one or more paths, attempt to identify one or more event records of the plurality of event records that correspond to the path; and
   generate an attestation score based on a number of the one or more event records identified.

11. The system of claim 8, further comprising a network evolver configured to mutate the candidate workflow network to generate one or more new candidate workflow networks.

12. The system of claim 8, wherein the network inferencer is configured to generate the candidate workflow network from the plurality of event clusters by associating each event cluster with a node in the candidate workflow network and creating connections between nodes in the candidate workflow network based at least in part upon relationships between the event clusters.

13. The system of claim 8, wherein the workflow inferencer is configured to generate the workflow description from the candidate workflow network by mapping the candidate workflow network to the workflow description based at least in part upon event types correlated to nodes in the candidate workflow network.

14. A computer-implemented method for generating a workflow description corresponding to a non-workflow program, the method comprising performing computer-implemented operations for:
   at one or more computing systems comprising at least one processor,
      clustering, by the at least one processor, a plurality of event records generated by the non-workflow program during execution of the non-workflow program into a plurality of event clusters, the event records being generated by a plurality of event sources, the event records comprising one or more of an access log, an error log, a service call record, or an event trace, the event sources comprising one or more of a program, a module, a thread, a function, an application, a software component, or a hardware component utilized to implement the non-workflow program;

generating, by the at least one processor, a candidate workflow network based at least in part upon the plurality of event clusters;

generating one or more scores for the candidate workflow network, the scores comprising an explanation score that expresses an ability of the candidate workflow network to explain the event records;

generating, by the at least one processor, the workflow description corresponding to the non-workflow program based at least in part upon the candidate workflow network; and storing program code from the non-workflow program in the workflow description, the program code configured to implement one or more functions associated with the non-workflow program; and executing, by the one or more computing systems, the workflow description by executing the program code stored in the workflow description instead of executing the non-workflow program.

15. The computer-implemented method of claim 14, wherein generating a candidate workflow network based at least in part upon the plurality of event clusters comprises:

associating each event cluster with a node in the candidate workflow network; and creating connections between nodes in the candidate workflow network based at least in part upon relationships between the event clusters.

16. The computer-implemented method of claim 14, wherein generating a workflow description corresponding to the non-workflow program based at least in part upon the selected candidate workflow network comprises mapping the selected candidate workflow network to a workflow description based at least in part upon event types correlated to nodes in the candidate workflow network.

17. The computer-implemented method of claim 14, wherein generating the one or more scores for the candidate workflow network comprises generating an attestation score that expresses an ability of the event records to attest to the candidate workflow network.

18. The computer-implemented method of claim 14, further comprising:

mutating the candidate workflow network to generate one or more new candidate workflow networks;

generating one or more scores for the new candidate workflow networks; and selecting one of the new candidate workflow networks based at least in part upon the scores generated for the new candidate workflow networks, and wherein generating the workflow description corresponding to the non-workflow program comprises generating the workflow description based at least in part upon the selected new candidate workflow network.

19. The computer-implemented method of claim 14, and further comprising:

determining the quality of the event clusters is less than a predetermined quality; and performing additional clustering of the event records.

20. The computer-implemented method of claim 14, and further comprising:

determining that an event record of the event records is not predicted by the candidate workflow network; and reducing at least one of the one or more scores of the candidate workflow network.

* * * * *